United States Patent
Steedman et al.

(10) Patent No.: US 9,632,526 B2
(45) Date of Patent: Apr. 25, 2017

(54) MICROCONTROLLER WITH DIGITAL CLOCK SOURCE

(71) Applicant: Microchip Technology Incorporated, Chandler, AZ (US)

(72) Inventors: Sean Steedman, Phoenix, AZ (US); Fanie Duvenhage, Phoenix, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/087,844

(22) Filed: Nov. 22, 2013

(65) Prior Publication Data

US 2014/0145774 A1 May 29, 2014

Related U.S. Application Data

(60) Provisional application No. 61/729,699, filed on Nov. 26, 2012.

(51) Int. Cl.
*G06F 1/10* (2006.01)
*G06F 1/04* (2006.01)
*G06F 1/08* (2006.01)

(52) U.S. Cl.
CPC ..................... *G06F 1/08* (2013.01)

(58) Field of Classification Search
USPC .... 327/165, 166, 291–299, 374, 178; 716/6; 326/93–98
See application file for complete search history.

(56) References Cited

U.S. PATENT DOCUMENTS

| | | | |
|---|---|---|---|
| 5,371,765 A * | 12/1994 | Guilford | 375/373 |
| 5,448,191 A * | 9/1995 | Meyer | 327/105 |
| 5,767,747 A * | 6/1998 | Pricer | 331/46 |
| 6,236,278 B1 * | 5/2001 | Olgaard | 331/25 |
| 6,954,114 B2 * | 10/2005 | Schoner | 331/177 R |
| 7,208,990 B1 * | 4/2007 | Hassun | 327/156 |
| 7,262,645 B2 * | 8/2007 | Lee et al. | 327/141 |
| 7,898,342 B2 * | 3/2011 | Jasniewicz et al. | 331/2 |
| 8,648,626 B2 * | 2/2014 | Lin | 327/105 |
| 2005/0093636 A1 * | 5/2005 | Jasniewicz et al. | 331/34 |
| 2007/0025565 A1 * | 2/2007 | Kim et al. | 381/98 |
| 2007/0103239 A1 * | 5/2007 | Saeki et al. | 331/16 |

(Continued)

OTHER PUBLICATIONS

Yu, Shuhuan et al., "A Digital-Trim Controlled On-Chip RC Oscillator," Proceedings of the 44th IEEE Midwest Symposium on Circuits and Systems, 4 pages, Aug. 14, 2001.

(Continued)

*Primary Examiner* — Brandon S Cole
(74) *Attorney, Agent, or Firm* — Slayden Grubert Beard PLLC

(57) ABSTRACT

A microcontroller has a numerical controlled oscillator receiving a primary clock signal and is configured to provide an internal system clock of the microcontroller. A method for operating a microcontroller performs the following steps: Selecting a primary clock signal from a plurality of clock signals; feeding the primary clock signal to a numerical controlled oscillator; configuring the numerical controlled oscillator to generate a numerical controlled clock signal; and providing the numerical controlled clock signal as an internal system clock for the microcontroller.

21 Claims, 3 Drawing Sheets

(56) References Cited

U.S. PATENT DOCUMENTS

| | | | |
|---|---|---|---|
| 2010/0052797 A1* | 3/2010 | Carley et al. | 331/18 |
| 2010/0109714 A1* | 5/2010 | Lindfors et al. | 327/105 |
| 2011/0050998 A1* | 3/2011 | Gao et al. | 348/536 |
| 2011/0208329 A1 | 8/2011 | Castor-perry | 700/94 |
| 2011/0248785 A1* | 10/2011 | Lin | 331/34 |
| 2013/0120053 A1* | 5/2013 | Mei | G06F 3/0418 327/517 |
| 2013/0156073 A1* | 6/2013 | Gunawardena et al. | 375/150 |
| 2013/0181770 A1* | 7/2013 | Sasaki | 329/307 |
| 2014/0368467 A1* | 12/2014 | Park et al. | 345/174 |

OTHER PUBLICATIONS

Microchip Technology Incorporated, "PIC10(L)F320/322 Data Sheet, 6/8 Pin, High Performance, Flash Microcontrollers," XP055096949, 210 pages, Jul. 11, 2011.

Gharoo, Jatinder et al., "AN1470: Manchester Decoder Using the CLC and NCO," Microchip Technology Incorporated, URL: http//wwl.microchip.com/downloads/en/AppNotes/01470A.pdf, 16 pages, Oct. 17, 2012.

International Search Report and Written Opinion, Application No. PCT/US2013/071631, 14 pages, Jan. 28, 2014.

Microchip Technology Incorporated, "PIC12(L)F1501: 8-Pin Flash, 8-Bit Microcontrollers," pp. 1-9 and 174-179, © 2011-2014.

Tietze, Ulrich et al., *Electronic Circuits: Design and Applications*, Springer Verlag, ISBN 0-387-50608-X, pp. 559-562, © 1991.

Axelson, Jan, *The Microcontroller Idea Book: Circuits, Programs, and Applications Featuring the 8052-BASIC Microcontroller*, Lakeview Research, ISBN 0-9650819-0-7, pp. 1-2, © 1997.

* cited by examiner

MICROCONTROLLER WITH DIGITAL CLOCK SOURCE

CROSS-REFERENCE TO RELATED APPLICATIONS

This application claims the benefit of U.S. Provisional Application No. 61/729,699 filed on Nov. 26, 2012, entitled "MICROCONTROLLER WITH DIGITAL CLOCK SOURCE", which is incorporated herein in its entirety.

TECHNICAL FIELD

The present disclosure relates to microcontrollers, in particular microcontrollers with integrated clock control units.

BACKGROUND

Most microcontroller clock schemes are based on binary dividers of a standard clock. For instance, on conventional microcontroller products if a 16 MHz base clock may be used as the system clock. However, a user may scale down this frequency, in particular for low power applications. Also, peripheral devices may be supplied with clock signals derived from such a system clock by division of $2^n$, wherein n>1. For example, in the above case the following frequencies may be selected for a system clock or other clock signals derived from the system clock: [8, 4, 2, 1, 0.5, 0.25, 0.03125] MHz. These selectable output frequencies are based on a divider of [2, 4, 8, 16, 32, 64, 512], respectively.

SUMMARY

There exists a need for microcontroller with a more flexible configurability of a digital clock source that can be used as a system clock and/or as a clock source for peripheral devices or other uses.

According to an embodiment, a microcontroller may comprise a numerical controlled oscillator receiving a primary clock signal and being configured to provide an internal system clock.

According to a further embodiment, the numerical oscillator may receive a reference clock r(x) and a numerical value q and provides an output clock, wherein the numerical value is provided by a register. According to a further embodiment, the output clock f(q)=r(x)*A; wherein A is a numeric oscillator transfer function. According to a further embodiment, the system clock can be used to operate the central processing core of the microcontroller. According to a further embodiment, at least one other internal clock can be derived from the internal system clock. According to a further embodiment, the microcontroller may further comprise another numerical controlled oscillator to provide for a second internal clock. According to a further embodiment, the microcontroller may comprise a selection unit operable to select the primary clock signal from at least one internal and at least one external clock signal. According to a further embodiment, the numerical controlled oscillator may comprise an adder having a first input coupled with an increment register, and an accumulator being clocked by the primary clock signal having an input coupled with an output of the accumulator and an output coupled with the second input of the accumulator, wherein an overflow output of the accumulator provides said internal system clock signal. According to a further embodiment, the microcontroller may further comprise a multiplexer receiving a plurality of clock signals and being controlled to select one the plurality of clock signals as the primary clock signal. According to a further embodiment, the increment register is buffered. According to a further embodiment, the microcontroller may further comprise an AND gate with a first input coupled with said overflow output and a second input receiving the primary clock signal, wherein an output of the AND gate provides the system clock. According to a further embodiment, the microcontroller may further comprise a multiplexer receiving the output of the numerical controlled oscillator and a plurality of external and internal clock signals, wherein the multiplexer is controlled by a configuration register to select the internal clock. According to a further embodiment, the primary clock can be provided by an internal oscillator of said microcontroller. According to a further embodiment, the internal oscillator can be an RC-oscillator with digital trimming capabilities.

According to another embodiment, a method for operating a microcontroller may comprise: Selecting a primary clock signal from a plurality of clock signals; feeding the primary clock signal to a numerical controlled oscillator; configuring the numerical controlled oscillator to generate a numerical controlled clock signal; and providing the numerical controlled clock signal as an internal system clock for the microcontroller.

According to a further embodiment of the method, the numerical oscillator may receive a reference clock r(x) and a numerical value q and provides an output clock, wherein the numerical value is provided by a register. According to a further embodiment of the method, the output clock f(q)=r(x)*A; wherein A is a numeric oscillator transfer function. According to a further embodiment of the method, the numerical oscillator transfer function may comprise an operation selected from an adding, a multiplying, a dividing, a subtracting, and a logarithmic function. According to a further embodiment of the method, the system clock can be used to operate the central processing core of the microcontroller. According to a further embodiment of the method, at least one other internal clock can be derived from the internal system clock. According to a further embodiment of the method, the numerical controlled oscillator may perform the step of: adding an increment value to an accumulator wherein the accumulator is being clocked by the primary clock signal having an input coupled; and generating an overflow output signal by the accumulator which provides said internal system clock signal. According to a further embodiment of the method, the method may further perform the steps: providing a plurality of external and internal clock signals, and selecting one of the plurality of external and internal clock signals or the output signal of the numerical controlled oscillator as the internal system clock. According to a further embodiment of the method, the primary clock can be provided by an internal oscillator of said microcontroller. According to a further embodiment of the method, the internal oscillator can be an RC-oscillator with digital trimming capabilities.

DETAILED DESCRIPTION

Figure 1:
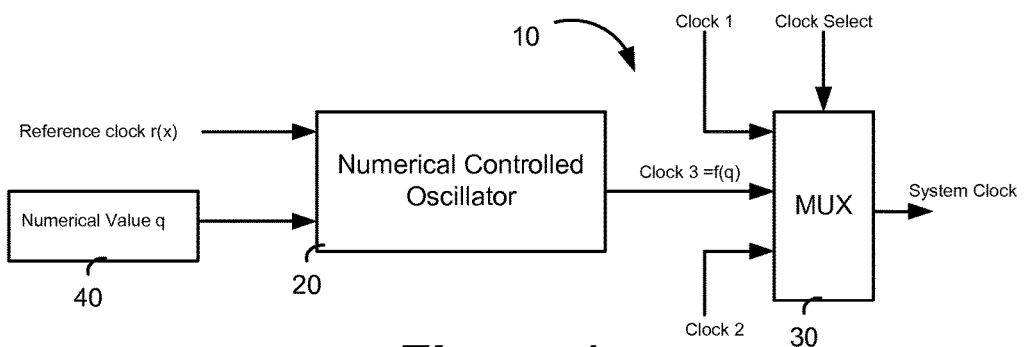
FIG. 1 shows an exemplary block diagram of a numerical controlled oscillator used as a system clock source.

According to various embodiments, a different type of on-chip clock peripheral can be used to provide for a programmable clock source. For example a numerically controlled oscillator (NCO) according to various embodiments can be used as a digital source clock provider. According to various embodiments, a numerically controlled oscillator is a module with two inputs, a reference clock r(x) and a numeric value q. FIG. 1 shows such a generic numerical oscillator 20 embedded in a system clock circuit 10 of, for example a microcontroller. The numerical controlled oscillator 20 receives a reference clock r(x) and a numerical value q which may be stored in a configuration register 40, for example a special function register associated with the NCO. The numeric value q entered into the module performs an operation on the reference clock to provide an output frequency f(q). Therefore f(q)=r(x)*A; A is the numeric oscillator transfer function. The transfer function can be as simple as an addition. However other functions can be implemented such as a adding, subtracting, multiplicative, dividing, logarithmic or any other mathematical function. In the following example a simple adder is used to form a numerical controlled oscillator. However, a numerical controlled oscillator as defined above may have other functions to provide for a numerical controlled clock signal as stated above.

In FIG. 1, the output signal of the numerical controlled oscillator 20 is fed to a multiplexer 30 which may receive one or more other clock signals which can be generated internally or may be fed from an external source. Alternatively, an external component, such as a crystal, may control an internal oscillator circuit to provide one of these additional clock signals. Multiplexer 30 may receive a control signal, for example, from a non-volatile configuration register to select one of the clock sources as the system clock. The reference clock r(x) may be preferably one of the signals Clock 1 or Clock 2 in the above example. Moreover, an additional multiplexer may be provided to select a reference clock form a plurality of internal and/or external clock signals. The NCO 20 can thus be used to provide a system clock for example for a microcontroller.

For example, as a peripheral an NCO is known to provide the user with a fixed duty-cycle, frequency controlled output. For example, microcontroller PIC10F320 comprises an NCO peripheral to generate a signal with a fixed duty cycle or to provide a pulse width control. Such a signal can then be used in an application in which the microcontroller is used.

However, according to various embodiments, such a numerical controlled oscillator can also be used to provide a system clock. Hence a clock signal developed by the NCO can be applied to system clocks of a microcontroller.

The system clock is the clock which drives operation of the microcontroller module. The system clock is typically derived from an analog clock source such as a main oscillator which can be an internal oscillator or external oscillator. According to various embodiments, the primary clock signal of the main microcontroller oscillator is then tied into the NCO, which then drives the system clock from its output.

The NCO is a digital solution to the problem, where clock sources tend to be analog solutions (for example internal RC oscillators, crystal oscillators, etc.). Also, according to various embodiments, there are two needs that are being solved. One is a variable clock source that can be controlled digitally, which is accomplished by the NCO peripheral. The other is that internal clock frequencies of a microcontroller are binary multiples, so the step size between larger frequencies is larger and larger as frequency increases. The NCO can be applied to fill in the gaps between these frequency increases to allow the user to optimize performance issues like: power, specific frequency, etc.

NCO clocks could be applied to different modules individually to allow for programmable timings by the user. Thus, it can be used advantageously as a system clock, watchdog timer frequency source, peripheral clock source, etc. An NCO system clock allows users to optimize performance, choose intermediate frequencies from binary weighted values.

Figure 2:
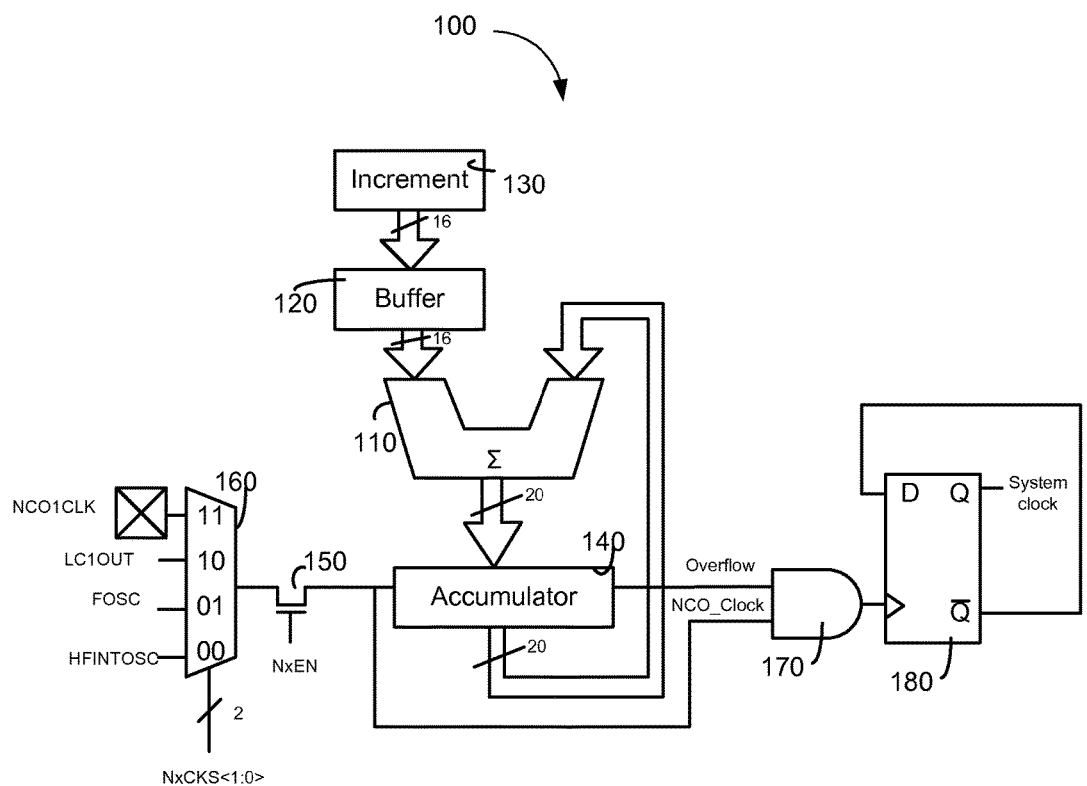
FIG. 2 a block diagram of a first embodiment of a clock control circuit according to various embodiments.

FIG. 2 shows a first possible implementation of a numerical controlled oscillator 100 according to various embodiments. A variety of clock inputs can be selected through a multiplexer 160. For example, an external clock through an external pin NCO1CLK or one of several internal clock signals LC1OUT, FOSC, or HFINTOSC can be selected through the multiplexer. For example, LC1OUT is an output signal provided by a programmable logic cell, FOSC and HFINTOSC are internal clock signal from the internal or integrated oscillator. This primary clock is then fed to the numerical controlled oscillator as shown in FIG. 1. The numerical controlled oscillator comprises an increment register 130 coupled with a buffer 120 that feeds a first input of an adder 110. The adder output is coupled with an accumulator 140 whose output is fed back to the second input of the adder 110. The primary input clock signal is fed through an enable gate 150 to control accumulator 140 and also to a first input of AND gate 170. An overflow from the accumulator is fed to a second input of AND gate 170 to generate the numerical controlled output clock. The output of AND gate 170 is coupled with the clock input of D-Flip-Flop 180 whose inverted output is coupled with its D-input. The non-inverted output of D-Flip-Flop 180 provides for a clock output, which according to various embodiments, can be selected as a system clock. Thus, a wide variety of frequencies can be directly controlled through programming of the control registers associated with the NCO 100. A plurality of such NCOs can be provided to provide multiple internal clocks such as system clocks and/or peripheral clocks. Moreover, standard digital divider may be coupled with the output of an NCO to provided derived internal clock signals.

Figure 3:
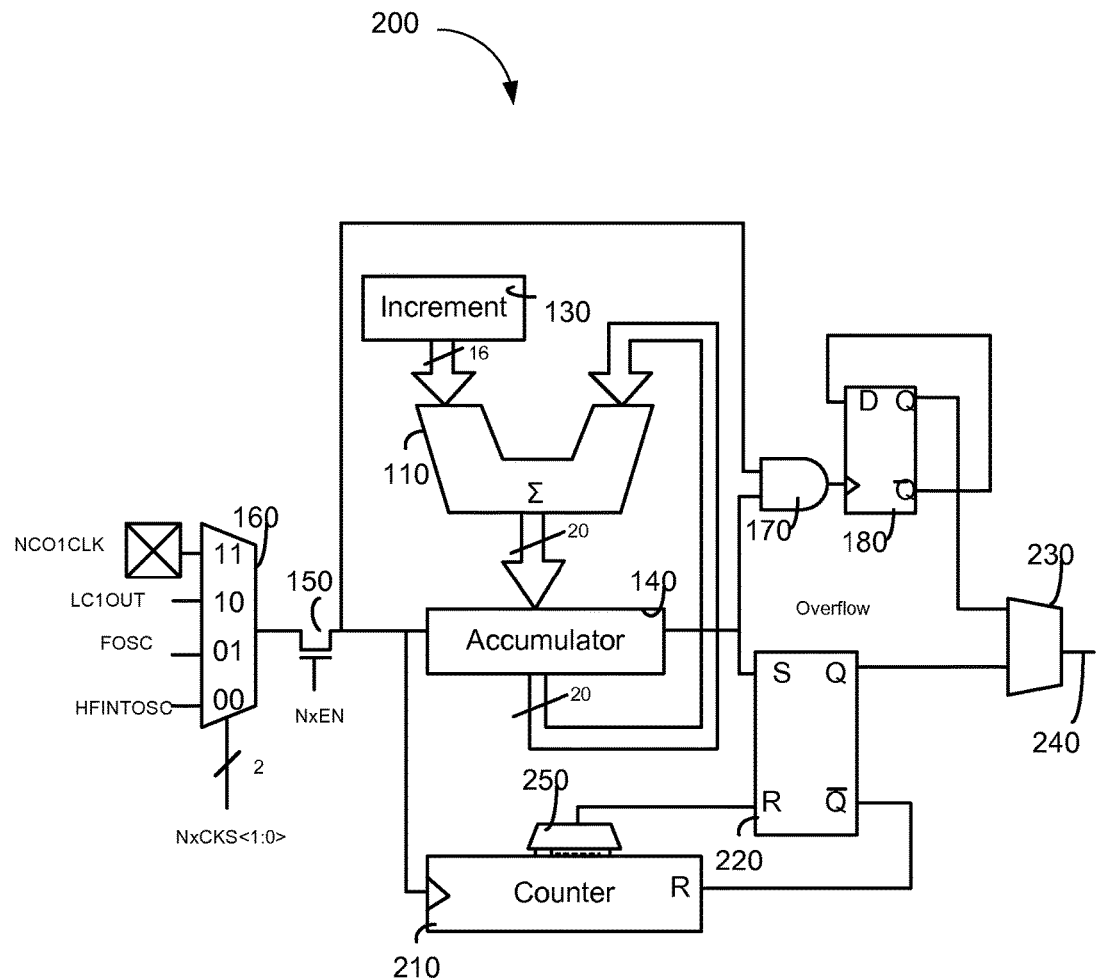
FIG. 3 a block diagram of another embodiment of a clock control circuit according to various embodiments.

FIG. 3 shows another embodiment of a numerical controlled oscillator 200. Here increment register 130 is directly coupled with adder 110. However, a buffer could be used as shown in FIG. 2. The primary clock signal is routed again through enable gate 150 and is also passed to a clock input of counter 210. The overflow output of accumulator 140 is coupled with the set input of RS-Flip-Flop 220. A multiplexer 250 is operable to select one of the bits of counter 210 to reset Flip-Flop 220. Counter 210 is reset by inverted Q output of Flip-Flop 220. Multiplexer 230 is provided to select either the Q output of D-Flip-Flop 180 or the Q output of RS-Flip-Flop 220 as the output signal of the numeric controlled oscillator. According to an embodiment, the overflow output of accumulator 140 may also be fed to an AND gate which receives the primary clock signal similar as in FIG. 1. Before it is fed to Flip-Flop 220 and multiplexer 230.

Figure 4:
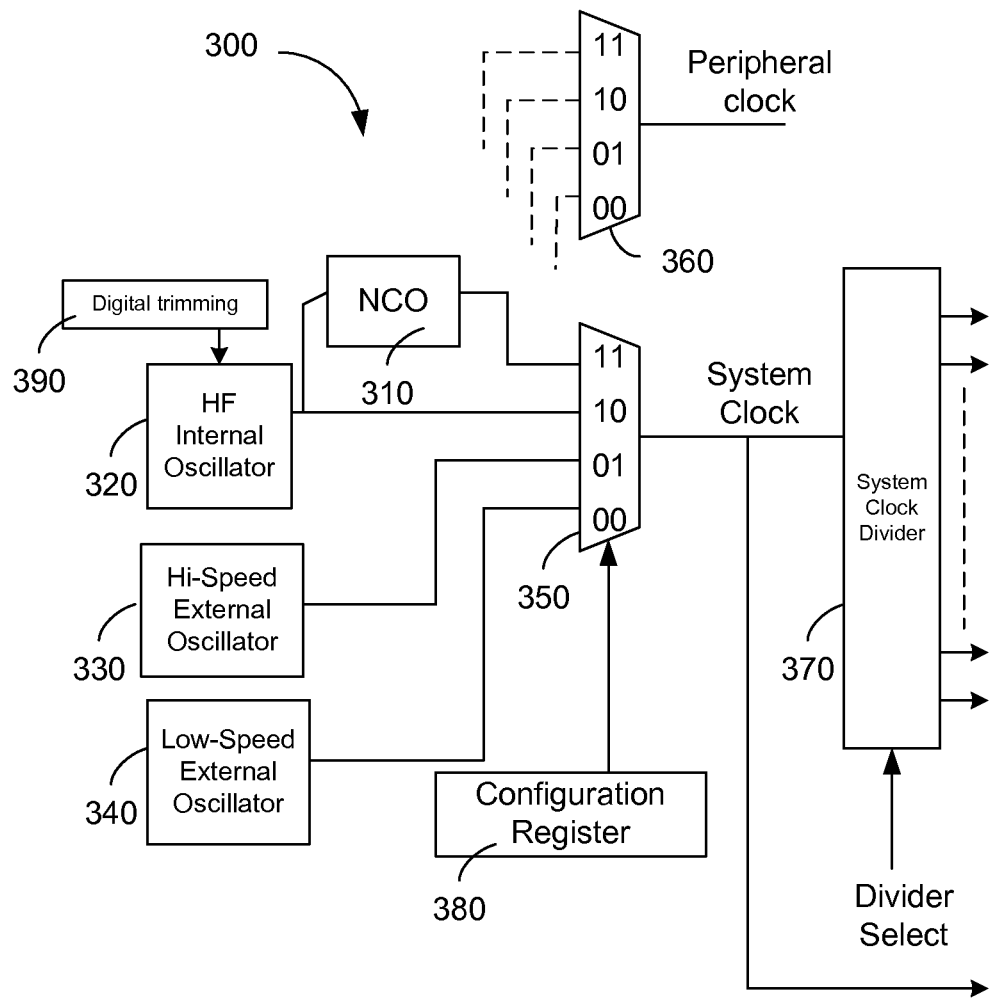
FIG. 4 shows a clock select circuit for a microcontroller.

FIG. 4 shows an embodiment of how an NCO can be integrated within a microcontroller to provide a selectable system clock. A high frequency internal oscillator 320 may be provided on chip. In addition, an external high speed oscillator 330 and an external low speed oscillator 340 may be provided. Other internal and external clock sources may be available. According to embodiments, the NCO 310 is fed directly from the internal high frequency oscillator 320 which can be for example an RC oscillator with digital trimming capabilities 390. Here a system clock selection multiplexer 350 is provided that can be controlled for example by a configuration register 380 or any other special function register. Thus, a user can program a configuration register to select any of the four clock sources wherein upon selection of the NCO 310 a wide range of additional frequencies can be programmed by means of a respective associated control register. In addition, another multiplexer 360 may be provided to select a second internal clock signal, for example for one or more peripheral devices such as timers, pulse width modulators, etc. The selected system clock may then either be directly used as the system clock or fed to a divider 370 for dividing the clock by $2^n$, wherein n>=1.

What is claimed is:

1. A microcontroller comprising:
    a numerical controlled oscillator receiving a first clock signal and being configured to generate a second clock signal;
    a first multiplexer controlled to select the first clock signal or the second clock signal;
    wherein the selected clock signal is distributed within the microcontroller as the system clock, wherein the system clock drives the operation of the microcontroller.

2. The microcontroller according to claim 1, wherein the system clock is used to operate the central processing core of the microcontroller.

3. The microcontroller according to claim 2, wherein at least one other internal clock is derived from the internal system clock.

4. The microcontroller according to claim 1, further comprising another numerical controlled oscillator to provide for a second internal clock.

5. The microcontroller according to claim 1, comprising a selection unit operable to select the first clock signal from at least one internal and at least one external clock signal.

6. The microcontroller according to claim 1, wherein the numerical controlled oscillator comprises
    an adder having a first input coupled with an increment register, and
    an accumulator being clocked by the first clock signal having an input coupled with an output of the accumulator and an output coupled with the second input of the accumulator, wherein an overflow output of the accumulator provides an output clock signal of the numerical controlled oscillator.

7. The microcontroller according to claim 6, further comprising a second multiplexer receiving a plurality of clock signals and being controlled to select one the plurality of clock signals as the primary clock signal.

8. The microcontroller according to claim 6, wherein the increment register is buffered.

9. The microcontroller according to claim 6, further comprising an AND gate with a first input coupled with said overflow output and a second input receiving the first clock signal, wherein the second clock signal is derived from a signal at an output of the AND gate.

10. The microcontroller according to claim 6, wherein the first clock signal is an external or internal clock signal and wherein the multiplexer receives at least one further clock signal, wherein the multiplexer is controlled by a configuration register to select one of said first, second or further clock signal.

11. The microcontroller according to claim 10, wherein the first clock is provided by an internal oscillator of said microcontroller.

12. The microcontroller according to claim 11, wherein the internal oscillator is an RC-oscillator with digital trimming capabilities.

13. A method for operating a microcontroller comprising:
    providing a first clock signal from a plurality of clock signals;
    feeding the first clock signal to a numerical controlled oscillator;
    configuring the numerical controlled oscillator to generate a numerical controlled clock signal;
    controlling a multiplexer to select either the first clock or the numerical controlled clock signal as an internal system clock for the microcontroller, wherein the system clock drives the operation of the microcontroller.

14. The method according to claim 13, wherein the system clock is used to operate the central processing core of the microcontroller.

15. The method according to claim 14, wherein at least one other internal clock is derived from the internal system clock.

16. The method according to claim 13, wherein the numerical controlled oscillator performs the step of
    adding an increment value to an accumulator under control of the first clock signal;
    generating an overflow output signal by the accumulator from which said numerical controlled clock signal is derived.

17. The method according to claim 16, comprising
    providing a plurality of external and internal clock signals, and
    selecting one of the plurality of external and internal clock signals or the output signal of the numerical controlled oscillator as the internal system clock.

18. The method according to claim 17, wherein the first clock is provided by an internal oscillator of said microcontroller.

19. The method according to claim 18, wherein the internal oscillator is an RC-oscillator with digital trimming capabilities.

20. A microcontroller comprising:
    a numerical controlled oscillator receiving a primary clock signal and being configured to provide an internal system clock, wherein the numerical controlled oscillator comprises:
        an adder having a first input coupled with an increment register, and
        an accumulator being clocked by the primary clock signal having an input coupled with an output of the accumulator and an output coupled with the second input of the accumulator, wherein an overflow output of the accumulator provides a numerical output clock signal;
    and
    an AND gate with a first input coupled with said overflow output and a second input receiving the primary clock signal, wherein an output of the AND gate provides the system clock.

21. A microcontroller comprising:
    a central processing core receiving a system clock;
    an internal oscillator;
    a numerical controlled oscillator receiving a first clock signal from the internal oscillator and being configured to generate a second clock signal;

a first multiplexer controlled to select the first clock signal or the second clock signal;
wherein the selected clock signal is distributed within the microcontroller as the system clock, wherein the system clock is used to operate the central processing core of the microcontroller.

* * * * *